US010887631B2

(12) United States Patent
Sengupta et al.

(10) Patent No.: US 10,887,631 B2
(45) Date of Patent: Jan. 5, 2021

(54) DISTRIBUTED MULTI-DATACENTER VIDEO PACKAGING SYSTEM

(71) Applicant: Amazon Technologies, Inc., Seattle, WA (US)

(72) Inventors: Saurav Sengupta, Beaverton, OR (US); Kyle Sletmoe, Portland, OR (US); Kristopher Kosmatka, Portland, OR (US); William Shogren, Beaverton, OR (US); Rory McCarthy, Portland, OR (US); Gary Hertel, Beaverton, OR (US); Michael Kale, Portland, OR (US); Ramya Krishnamoorthy, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/841,091

(22) Filed: Dec. 13, 2017

(65) Prior Publication Data

US 2019/0082238 A1    Mar. 14, 2019

Related U.S. Application Data

(60) Provisional application No. 62/558,265, filed on Sep. 13, 2017.

(51) Int. Cl.
*H04N 21/2343* (2011.01)
*H04N 21/231* (2011.01)
(Continued)

(52) U.S. Cl.
CPC ..... *H04N 21/2343* (2013.01); *H04L 65/4084* (2013.01); *H04L 65/60* (2013.01);
(Continued)

(58) Field of Classification Search
CPC ............. H04N 21/8547; H04N 21/231; H04N 21/234; H04N 21/643; H04N 21/2343;
(Continued)

(56) References Cited

U.S. PATENT DOCUMENTS 9,124,671 B2 * 9/2015 Roth .................. H04N 21/2343
9,246,741 B2   1/2016 Eswaran
(Continued)

FOREIGN PATENT DOCUMENTS

WO    WO 2019/055564 A1    3/2019

OTHER PUBLICATIONS

International Search Report and Written Opinion dated Nov. 30, 2018 for International Application No. PCT/US2018/050748, 14 pages.

*Primary Examiner* — Randy A Flynn
(74) *Attorney, Agent, or Firm* — Knobbe, Martens, Olson & Bear, LLP

(57) ABSTRACT

A content streaming system and methodology for facilitating the management of content streaming. A video packaging and origination service requests streaming content that is organized according to content segments. Individual content segments will be encoded according to a plurality of encoding profiles and generated by different encoders. The video packaging and origination service utilizes synchronization information provided to the encoders to select individual encoded content segments responsive to the request for streaming content.

23 Claims, 8 Drawing Sheets

(51) Int. Cl.
  *H04N 21/234* (2011.01)
  *H04N 21/239* (2011.01)
  *H04N 21/24* (2011.01)
  *H04N 21/433* (2011.01)
  *H04N 21/4402* (2011.01)
  *H04N 21/643* (2011.01)
  *H04N 21/8547* (2011.01)
  *H04L 29/06* (2006.01)
  *H04L 29/08* (2006.01)

(52) U.S. Cl.
  CPC ....... *H04L 67/1021* (2013.01); *H04N 21/231* (2013.01); *H04N 21/234* (2013.01); *H04N 21/2393* (2013.01); *H04N 21/23106* (2013.01); *H04N 21/2402* (2013.01); *H04N 21/2407* (2013.01); *H04N 21/433* (2013.01); *H04N 21/4402* (2013.01); *H04N 21/643* (2013.01); *H04N 21/8547* (2013.01)

(58) Field of Classification Search
  CPC ......... H04N 21/23106; H04N 21/2393; H04N 21/2402; H04N 21/2407; H04N 21/433; H04N 21/4402; H04L 65/4084; H04L 65/60; H04L 67/1021
  See application file for complete search history.

(56) References Cited

U.S. PATENT DOCUMENTS

| | | | |
|---|---|---|---|
| 9,332,513 B2 | 5/2016 | Park et al. | |
| 9,426,543 B1* | 8/2016 | Li | H04N 21/8586 |
| 9,532,092 B1 | 12/2016 | Suryanarayanan et al. | |
| 10,298,968 B2 | 5/2019 | Sletmoe et al. | |
| 10,469,883 B2 | 11/2019 | Kosmatka et al. | |
| 10,542,302 B2 | 1/2020 | Hertel et al. | |
| 2005/0235047 A1* | 10/2005 | Li | H04L 29/06027 |
| | | | 709/219 |
| 2009/0034633 A1 | 2/2009 | Rodriguez | |
| 2009/0293093 A1* | 11/2009 | Igarashi | H04N 21/23439 |
| | | | 725/115 |
| 2010/0146139 A1* | 6/2010 | Brockmann | H04N 21/234318 |
| | | | 709/231 |
| 2010/0169977 A1* | 7/2010 | Dasher | H04N 21/21 |
| | | | 726/26 |
| 2010/0177631 A1 | 7/2010 | Chen | |
| 2010/0226428 A1* | 9/2010 | Thevathasan | H04L 29/06 |
| | | | 375/240.02 |
| 2010/0235528 A1* | 9/2010 | Bocharov | H04N 21/6437 |
| | | | 709/231 |
| 2010/0250710 A1 | 9/2010 | Cadwell et al. | |
| 2011/0083037 A1* | 4/2011 | Bocharov | H04N 21/23116 |
| | | | 714/4.11 |
| 2011/0235698 A1 | 9/2011 | Petre | |
| 2011/0274179 A1 | 11/2011 | Holden | |
| 2012/0215779 A1 | 8/2012 | Lipstone | |
| 2013/0064305 A1* | 3/2013 | Karlsson | H04N 19/30 |
| | | | 375/240.26 |
| 2013/0067036 A1 | 3/2013 | Nooney et al. | |
| 2013/0128947 A1* | 5/2013 | Fryer | H04N 21/2402 |
| | | | 375/240.01 |
| 2013/0142499 A1 | 6/2013 | Major et al. | |
| 2013/0177294 A1* | 7/2013 | Kennberg | H04N 21/8455 |
| | | | 386/241 |
| 2013/0198328 A1* | 8/2013 | Green | H04N 21/6373 |
| | | | 709/217 |
| 2013/0227074 A1* | 8/2013 | Odlund | H04N 21/2183 |
| | | | 709/219 |
| 2013/0322466 A1* | 12/2013 | Ucar | H04N 21/23608 |
| | | | 370/474 |
| 2013/0332971 A1* | 12/2013 | Fisher | H04N 21/266 |
| | | | 725/93 |
| 2014/0108586 A1 | 4/2014 | Zhao | |
| 2014/0140417 A1* | 5/2014 | Shaffer | H04N 21/23608 |
| | | | 375/240.28 |
| 2014/0189140 A1 | 7/2014 | Takahashi | |
| 2014/0189765 A1* | 7/2014 | Green | H04N 21/2365 |
| | | | 725/110 |
| 2015/0020135 A1* | 1/2015 | Frusina | H04N 21/4621 |
| | | | 725/116 |
| 2015/0304306 A1* | 10/2015 | Ponsford | G06F 21/6218 |
| | | | 713/171 |
| 2015/0324379 A1* | 11/2015 | Danovitz | H04N 21/4788 |
| | | | 707/825 |
| 2015/0381755 A1* | 12/2015 | Li | H04N 21/23106 |
| | | | 709/214 |
| 2016/0191592 A1 | 6/2016 | Asveren | |
| 2016/0191961 A1* | 6/2016 | Fisher | H04N 21/234309 |
| | | | 725/116 |
| 2016/0269279 A1 | 9/2016 | Beshai | |
| 2017/0013040 A1 | 1/2017 | Ponekker | |
| 2017/0055007 A1 | 2/2017 | Phillips | |
| 2017/0171264 A1 | 6/2017 | Salomons | |
| 2017/0188054 A1 | 6/2017 | Ma | |
| 2017/0272792 A1 | 9/2017 | Bachmutsky | |
| 2017/0289223 A1 | 10/2017 | Kipp | |
| 2017/0289639 A1 | 10/2017 | Reisner | |
| 2018/0139260 A1 | 5/2018 | Houle | |
| 2018/0184146 A1* | 6/2018 | Pichon | H04N 21/23805 |
| 2019/0082197 A1 | 3/2019 | Sletmoe et al. | |
| 2019/0082198 A1 | 3/2019 | Kosmatka et al. | |
| 2019/0082199 A1 | 3/2019 | Kale et al. | |
| 2019/0082201 A1 | 3/2019 | Sletmoe et al. | |
| 2019/0082217 A1 | 3/2019 | Hertel et al. | |
| 2019/0090001 A1 | 3/2019 | Smith | |

* cited by examiner

DISTRIBUTED MULTI-DATACENTER VIDEO PACKAGING SYSTEM

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. As with content providers, CDN service providers also provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
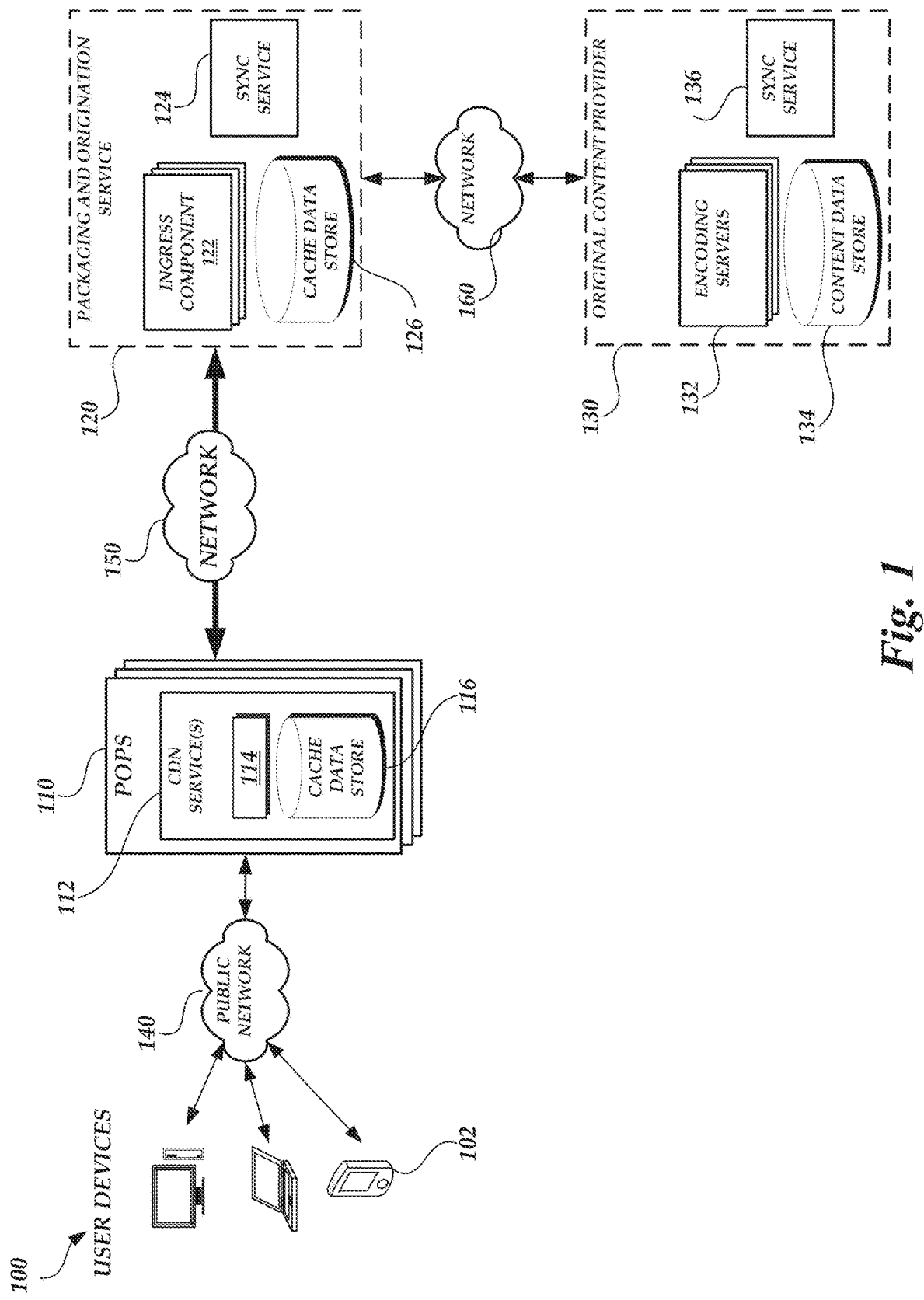
FIG. 1 is a block diagram of a content delivery environment that includes one or more user devices, a video packaging and origination service and an original content provider according to one embodiment.

Generally described, content providers can provide content to requesting users. With regard to video content, a content provider can implement a video packaging and origination service that is able to deliver video content to requesting users. Illustratively, a video packaging and origination service indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more.

To deliver content, content providers can organize requested content, such as a video file, into multiple segments that are then transmitted to requesting devices segment by segment. For example, in a video stream, each segment typically accounts for 2-10 seconds of video rendered on a receiving device. To provide content to the video packaging and origination service, individual content segments can be encoded by an encoder and transmitted to the video and origination service. Traditionally, a processing node on the video packaging and origination service can receive an incoming stream of encoded segments and then transmit the stream to requesting user devices. Additionally, each distinct encoded video segment (e.g., combination of bitrate encoding and format) is provided to the video packaging and origination service from a single encoder or encoding node.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG") MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like. Depending on the complexity of the encoding profiles specifying the bitrate and format, a single encoded may be constrained for more complex encoding profiles. This can limit the ability for content providers to provide different encoding bitrate/format combinations or require utilization of increased computing device resources to provide for individual encoding nodes.

To address at least a portion of the inefficiencies described above with regard to single encoder transmission nodes, aspects of the present application corresponding to a multi-encoder node system for transmitting multiple encoder streams. More specifically, aspects of the present application correspond to utilization of synchronization information to allow a video packaging and origination service to receive multiple input streams corresponding to a set of content segments. Each individual stream can be provided by different encoders based on the synchronization information, such as sequence reference numbers or timestamp information. The number of encoders utilized by the content source, such as a content provider, may be based on the complexity of the encoding profile (e.g., encoded bitrate and format), available encoder computing resources, available network bandwidth, financial cost information, processing cost information and the like.

Using the synchronization information, the video packaging and origination service can generate the set of encoded content by processing the multiple encoder streams and selecting encoded segments from different encoders. The video packaging and origination service can select from duplicate encoding streams based on time received, quality measurements, priority designations, attributable cost, or other selection criteria. Additionally, in the event of a failure of one of the encoders, the video packaging and origination service can request additional encoders to complete the transmission or begin collecting additional encoded segments from other encoders.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

Client computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g., a thermostat or refrigerator), controller, watch, eyewear, a home or car device, Internet of Things ("IoT") devices, virtual reality or augmented reality devices, digital media player, and the like. Each client computing device 102 may optionally include one or more data stores (not shown in FIG. 1) including various applications or computer-executable instructions, such as web browsers, used to implement the embodiments disclosed herein. Illustrative components of a client computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 110 can include one or more metric information processing component 114 for processing metric information provided by client computing devices 102 and a data store 116 for maintain collected metric information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and video packaging and origination service 110 are depicted as having a single connection to the network 140, individual components of the client computing devices 102 and video packaging and origination service 110 may be connected to the network 130 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 110 may utilize any number or combination of networks.

In accordance with embodiments, the video packaging and origination service 120 includes one or more servers for receiving content from original content providers 130 and processing the content to make available a set of received encoded bitrate segments. As described in further detail below, the video packaging and origination service 120 includes an ingress component 122 utilized to receive encoded data streams from multiple encoding servers 132 from original content providers 130. The video packaging and origination service 120 can further include synchronization services 124 for generating synchronization information utilized by the encoders, such as sequence numbers corresponding to the set of encoded segments, time stamp information related to a relative time of the encoded segments or from which relative time of encoded segments will be based, and the like. The video packaging and origination service 120 can further include a data store 126 for maintaining received encoded data for transmission.

It will be appreciated by those skilled in the art that the video packaging and origination service 120 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one more virtual machines implemented in a hosted computing environment. A hosted computing environment may include one or more rapidly provisioned and released computing resources, which computing resources may include computing, networking or storage devices. In another example, the video packaging and origination service 120 can include one or more egress components that can utilize the content received and processed from the ingress component 122 and further process the content for transmission to user devices 102. Such egress components may be implemented in conjunction with the ingress component 122, such as in a transcoding node. In other embodiments, the egress components may be implemented and managed independently of the ingress components 122, such as in separate stand-alone computing devices.

With continued reference to FIG. 1, the content delivery environment 100 also includes original content providers 130. Illustratively, the original content provider can include a plurality of encoders 132 for generating multiple encoded streams for transmission to the video packaging and origination service 120. The original content provider 130 can also include logic or other management components for determining how many encoders 132 should be utilized or how to manage the addition or removal of encoders. In some embodiments, the original content provider the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like. The video packaging and origination service 120 can further include a data store 134 for maintaining encoded data for transmission. The synchronization services 124 and 136 may work in conjunction or in a complimentary basis.

Figure 2:
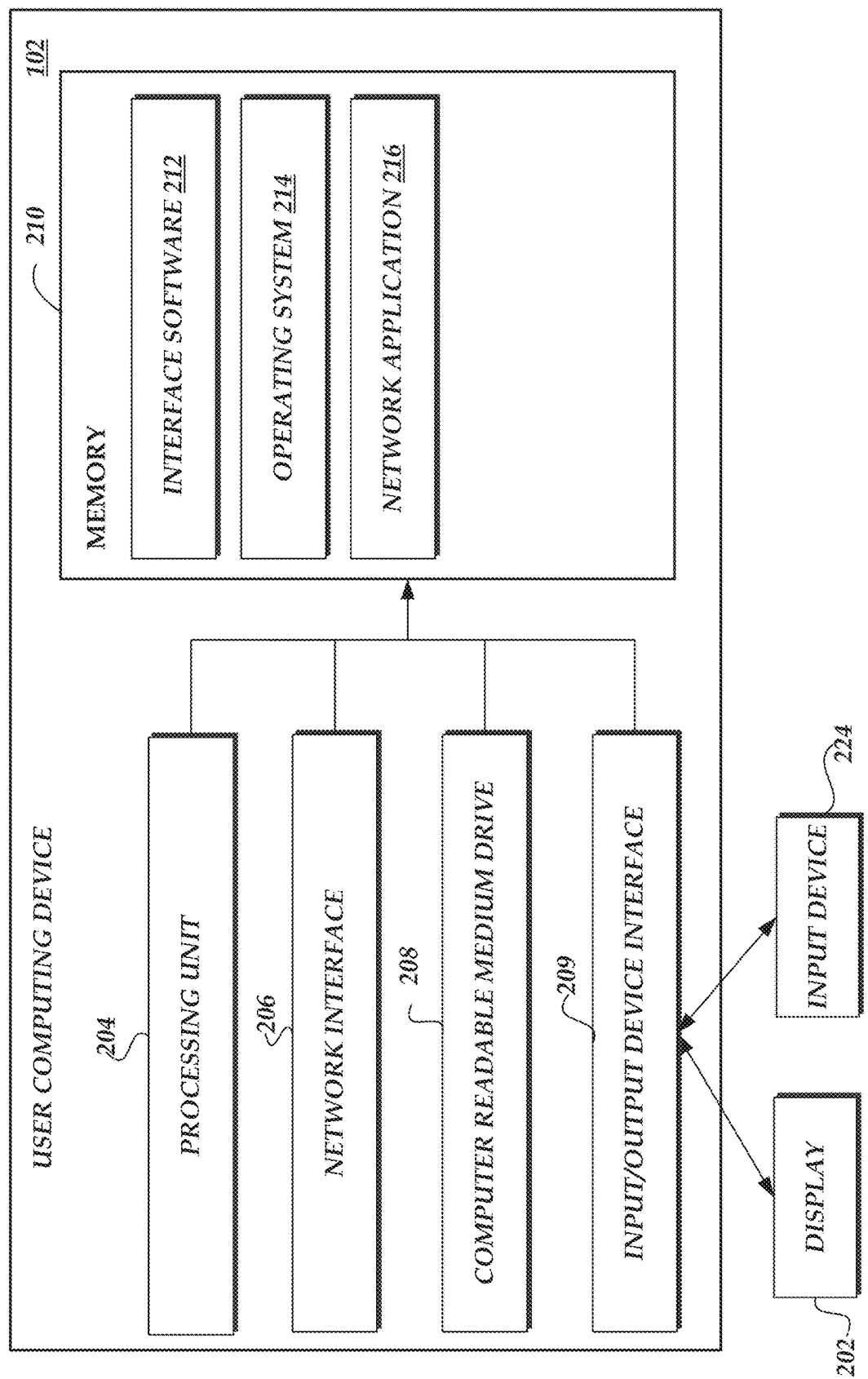
FIG. 2 is a block diagram of illustrative components of a user computing device configured to remotely process content in accordance with an illustrative embodiment.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 104 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1 and the video packaging and origination service 120 or the original content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for accessing content and communicating with the video packaging and origination service 120.

Figure 3:
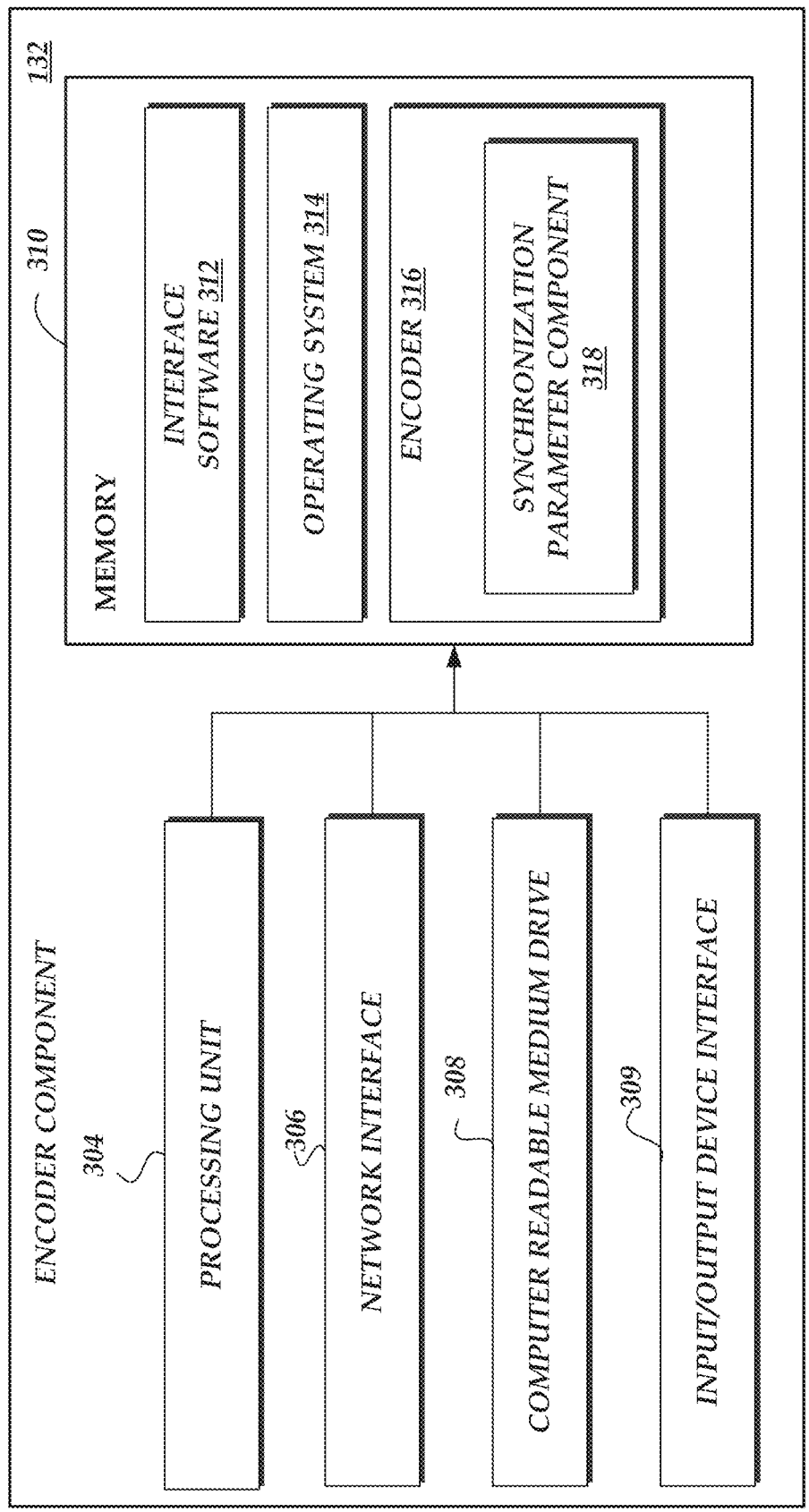
FIG. 3 is a block diagram of illustrative components of an encoder component configured to generate encoded content according to synchronization information in accordance with an illustrative embodiment.

FIG. 3 depicts one embodiment of an architecture of an illustrative server for encoding content as described herein. The general architecture of the encoder 132 depicted in FIG. 3 includes an arrangement of computer hardware and software components that may be used to implement aspects of the present disclosure. As illustrated, the encoder 132 includes a processing unit 304, a network interface 306, a computer readable medium drive 308, an input/output device interface 309, all of which may communicate with one another by way of a communication bus. The components of the encoder 132 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoder 132 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from the encoder 132. As will be described in detail below, the resulting information can include a dynamically configured bundle to encoding bitrates. Additionally, the memory 310 includes an encoder component 316 for processing content segments. Additionally, the encoder component 316 can further include a synchronization parameter component 318 for utilizing the synchronization information in the encoding process to increase the likelihood that encoded segments from multiple encoders can be utilized by a video packaging and origination service 120.

Figure 4:
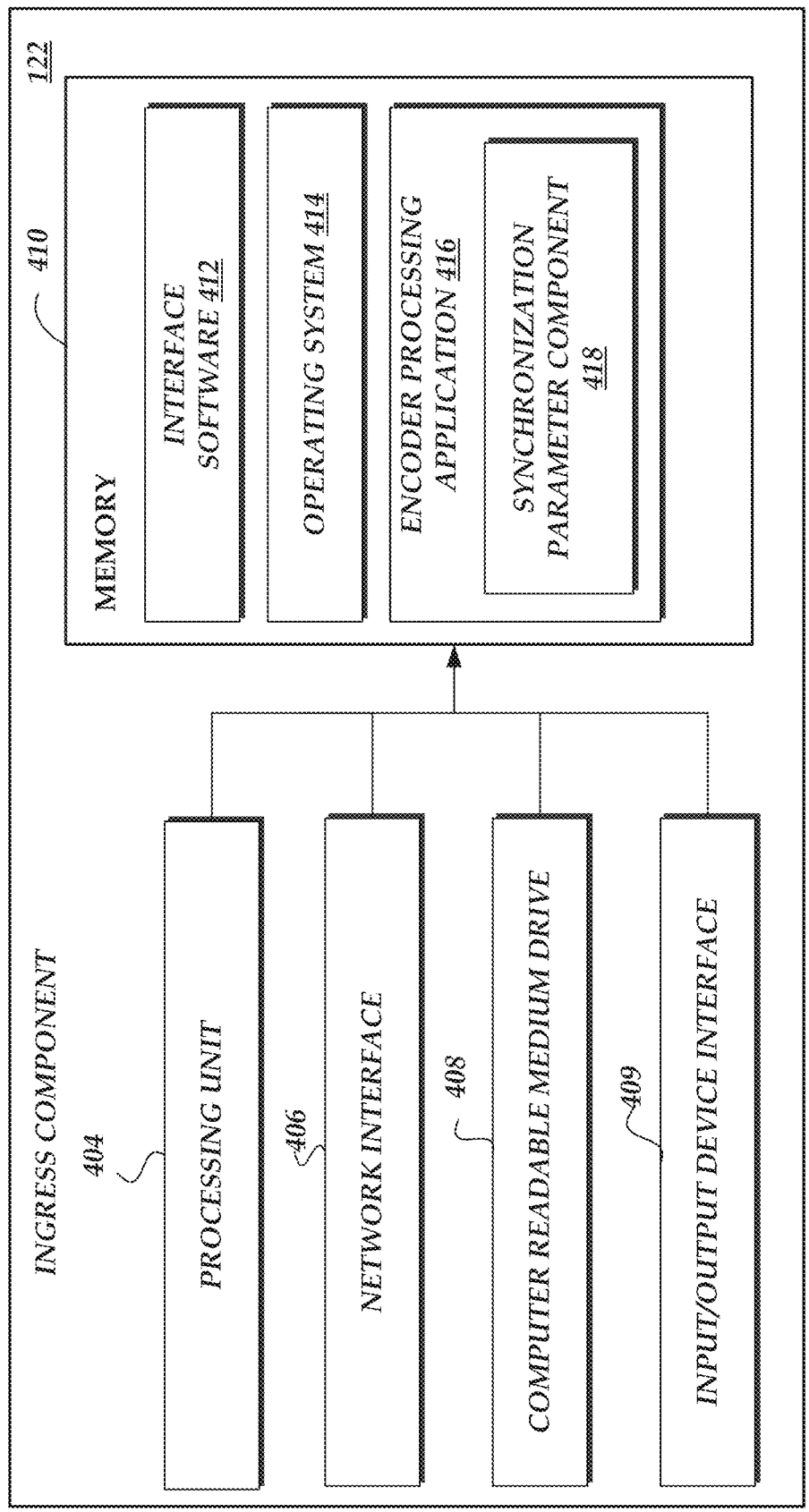
FIG. 4 is a block diagram of illustrative components of an ingress node configured to manage multiple encoder content streams in accordance with an illustrative embodiment

FIG. 4 depicts one embodiment of an architecture of an illustrative server for functioning as an ingress component 122 as described herein. The general architecture of the ingress component 122 depicted in FIG. 4 includes an arrangement of computer hardware and software components that may be used to implement aspects of the present disclosure. As illustrated, the ingress component 122 includes a processing unit 404, a network interface 406, a computer readable medium drive 408, an input/output device interface 409, all of which may communicate with one another by way of a communication bus. The components of the ingress component 122 may be physical hardware components or implemented in a virtualized environment.

The network interface 406 may provide connectivity to one or more networks or computing systems, such as the network 150 or network 160 of FIG. 1. The processing unit 404 may thus receive information and instructions from other computing systems or services via a network. The processing unit 404 may also communicate to and from memory 410 and further provide output information for an optional display via the input/output device interface 409. In some embodiments, the ingress component 122 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the ingress node. The memory 410 may further include computer program instructions and other information for implementing aspects of the present disclosure. For example, in one embodiment, the memory 410 includes interface software 412 for receiving and processing content requests from the ingress component 122. As will be described in detail below, the resulting information can include a dynamically configured bundle to encoding bitrates. Additionally, the memory 410 includes an encoder processing application 416 for processing incoming encoded content segments. Additionally, the ingress component 122 can further include a synchronization parameter component 418 for utilizing the synchronization information in the encoding process to increase the likelihood that encoded segments from multiple encoders can be utilized by the ingress component 122.

Figure 5A:
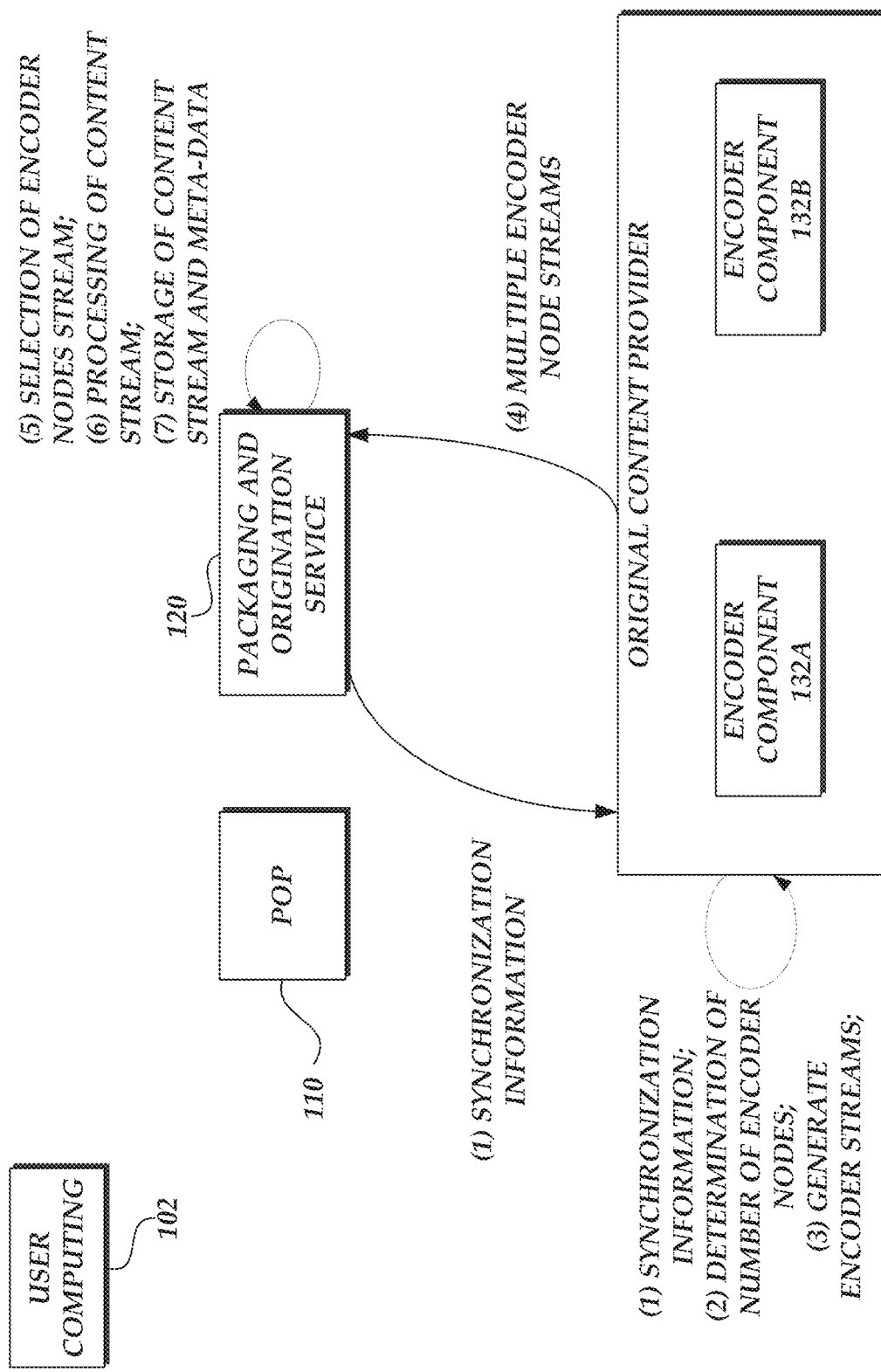
FIGS. 5A-5B are block diagrams of the content delivery environment of FIG. 1 illustrating the interaction related to video packing and origination service for obtaining encoded content for delivery to user devices.

At (1), the video packaging and origination service 120 can transmit synchronization information to the original content provider 130. Illustratively, the synchronization information is utilized by multiple encoders 132 to allow encoded segments from multiple encoders to be combined seamlessly or substantially seamlessly. For example, the synchronization information can include timestamp information related to a relative timestamp of individual encoded segments in the set of encoded segments. In another example, the synchronization information can include sequence numbers for the individual segments. In another example, the synchronization information can include a time of operation or other time elapsed information. The synchronization information is incorporated into the encoded segments and then utilized by the video packaging and origination service 120 to assemble the set of ordered segments, remove duplicates and identifying missing encoded segments. Although FIG. 5A illustrates the transmission of the synchronization information from the video packaging and origination service 120, in some embodiments, synchronization information may not be transmitted by the video packaging and origination service 120 and this interaction would be omitted altogether.

At (2), the receiving original content provider 130 determines the number of encoders that will be utilized to generate the requested encoded content streams. Illustratively, the determination the number of encoders will generally corresponding to a plurality of encoders that generate encoded content streams for identified requested content and incorporating synchronization information. In one embodiment, the determination of the number of encoders can be based on the complexity of the encoded bitrate and formation combination, available encoder resources, an attributable cost associated with the generated encoded content segments, preferences or service levels associated with the video packaging and origination service 120, network conditions (e.g., available bandwidth, network throughput, error rates), demand from users devices (e.g., total number of requests or frequencies of requests), and the like.

Illustratively, the content stream data may be transmitted by the original content provider 130 responsive to a request from a user device 102, a request from the video packaging and origination service 120, or other request/trigger. Illustratively, the encoded content can correspond to a set of encoded profiles corresponding to the encoding bitrate and format combinations that may be made available to users. For example, the video packaging and origination service 120 may provide a requesting user device 102 with a set of encoding bitrate and format combinations in order to support adaptive bitrate streaming. Accordingly, the request from the original content provider may transmit the set of identified encoding bitrates and formats or individual encoding bitrate and format combinations to supplement previously receive encoded segments. One skilled in the relevant art will appreciate that the transmission of the request or the identification of requested encoded segments (including format) can be facilitated in a number of ways.

At (3), the original content provider causes the selected number of encoders to generate encoded streams based on synchronization information. As described above, the video packaging and origination service 120 may provide the synchronization information. In another embodiment, the original content provider 130 can utilize self-providing synchronization, information provided by a third-party service or a combination. At (4), the original content provider begins transmitting a plurality of encoded content streams to the video packaging and origination service 120 and incorporating received/accessed synchronization information. In some embodiments, the encoders 132B and 132A are configured to transmit non-overlapping segments in which the encoding task for the set of segments it distributed among encoders. In other embodiments, the encoders are configured to at least partially transmit overlapping or redundant encoded segments.

The video packaging and origination service 120 receives the plurality of incoming encoded content streams from the encoders. At (5), the video packaging and origination service 120 selects encoded segments from the received streams. Illustratively, if the encoded content streams are non-overlapping, the video packaging and origination service 120 does not have to check for redundancies or other selection criteria (e.g., time received or reputation of encoders). If the encoded content streams may have overlapping segments, the video packaging and origination service 120 checks for redundancies or other utilizes selection criteria to determine which of the redundant encoded content segments will be utilized.

At (6), the video packaging and origination service 120 processes the received encoded segments. For example, the video packaging and origination service 120 can be adjustments or error correction for any of the selected encoded segments. In other embodiment, if the synchronization information does not ensure perfectly compatible encoded segments, the video packaging and origination service 120 can extrapolate additional segments or portions to facilitate combination. Still further, in some embodiments, the ingress component 122 of the video packaging and origination service 120 generates deterministic data included in a set of meta-data utilized to access and generate outgoing content streams. Illustratively, the deterministic data can include timestamp information related to a time of play of the set of encoded segments, sequence number identifying an order of the encoded content segment in the set of encoded segments, a time of operation of the encoder and the like. In another example, the ingress component 122 or content management service 126 can conduct quality or error checking that can be included in meta-data. At (7) the video packaging and origination service 120 stores the cumulative set of encoded segments for delivery to user devices 102 along with any meta-data generated as part of the processing.

Figure 5B:
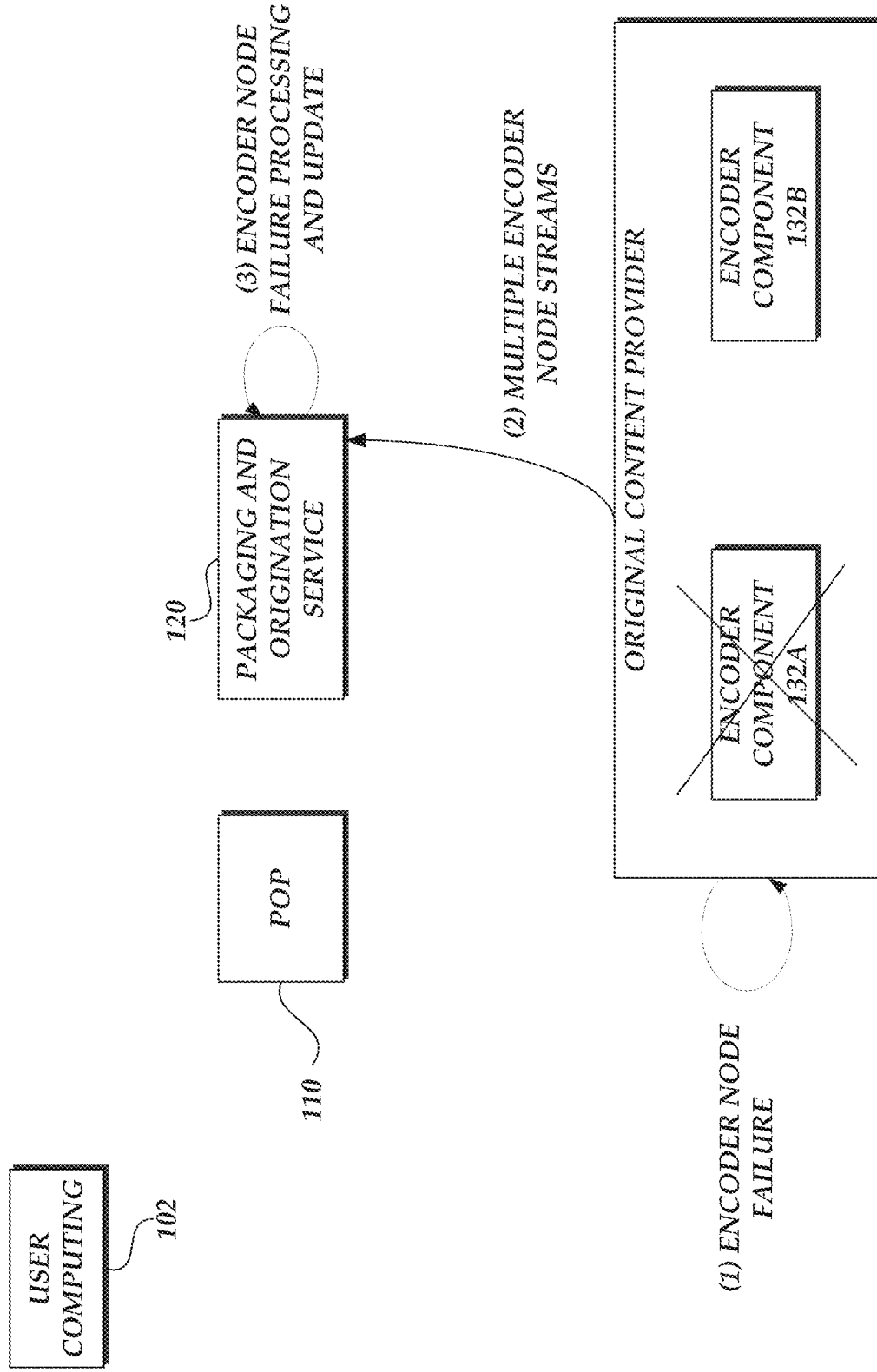

Turning now to FIG. 5B, a fail over scenario will be described. The interactions illustrated in FIG. 5B are based interaction after the initial transmission of multiple encoded segment transmission has begun. At (1), the original content provider 130 experiences an encoder failure, generally illustrated as a failure to encoded component 132A. At (2), the original content provider continues transmitting a plurality of encoded content streams to the video packaging and origination service 120 and incorporating received/accessed synchronization information. In some embodiments, if the encoders 132B and 132A were previously configured to transmit non-overlapping segments in which the encoding task for the set of segments it distributed among encoders, the original content provider (via request or a priori) will be required to update the configuration of the remaining encoders 132 or to otherwise cause the initiation of additional encoders. In other embodiments, the encoders may be configured will at least partially overlapping encoded segments. In this embodiment, the original content provider may not choose to make any changes to the configurations.

At (3), the video packaging and origination service 120 receives the adjusted encoder node streams and processing the determine failover. Illustratively, the ingress component 122 may have specific rules regarding failover, such as switching to a default encoder node or set of nodes. In other embodiments, the video packaging and origination service 120 can request additional or alternative encoder nodes. Additionally, the video packaging and origination service 120 can scan for already received encoded nodes received from the encoder prior to failure and ensure that no additional errors were introduced prior to the determined failure.

Figure 6:
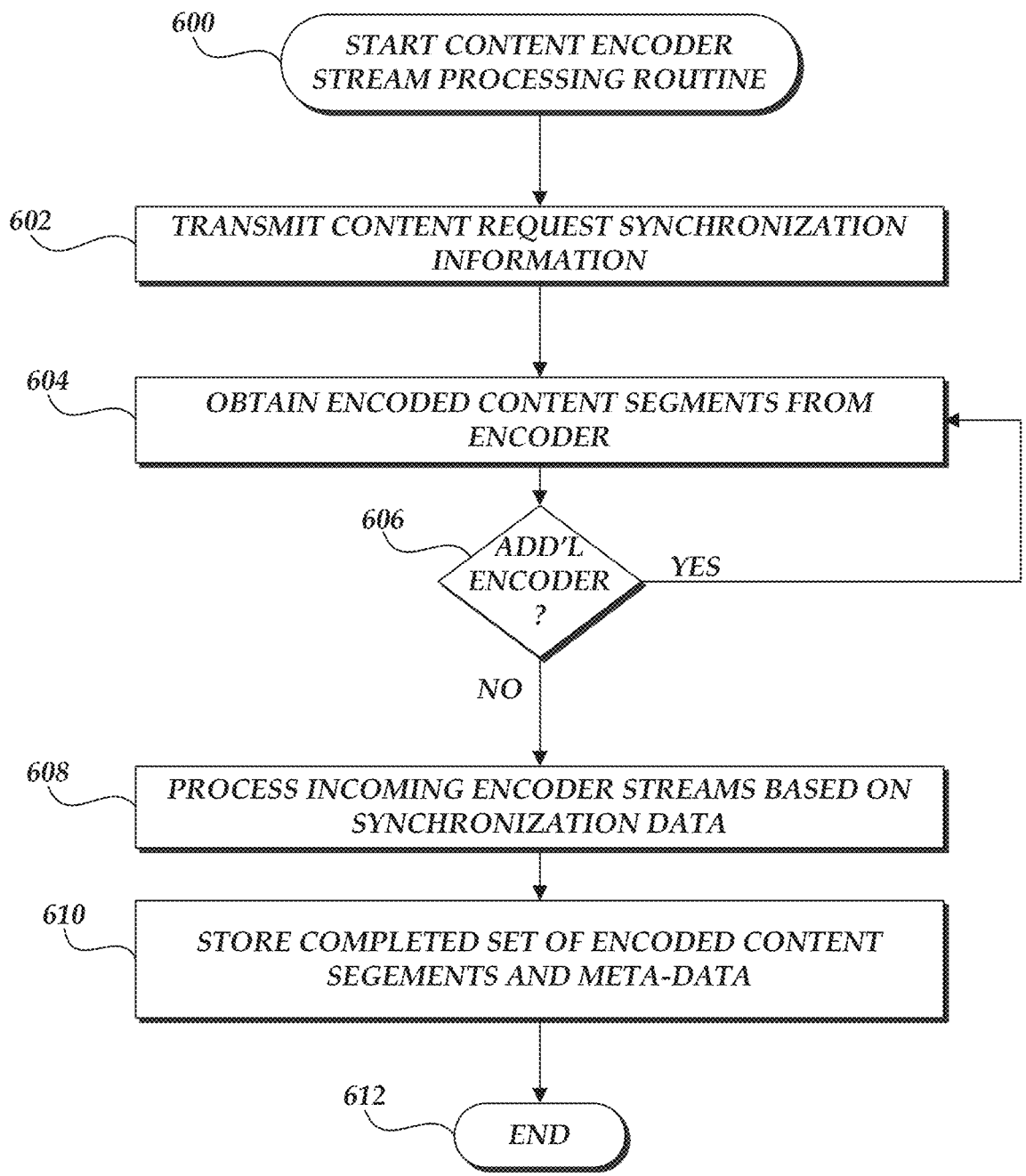
FIG. 6 is a flow diagram illustrative of a content processing routine implemented by a video packaging and origination service.

Turning now to FIG. 6, a routine 600 utilized by the video packaging and origination service 120 to receive and process multiple encoder streams will be described. Routine 600 may be illustratively implemented by an ingress component 122.

At block 602, the video packaging and origination service 120 can optionally transmit synchronization information to the original content provider 130. Illustratively, the synchronization information is utilized by multiple encoders 132 to allow encoded segments from multiple encoders to be combined seamlessly or substantially seamlessly. For example, the synchronization information can include timestamp information related to a relative timestamp of individual encoded segments in the set of encoded segments. In another example, the synchronization information can include sequence numbers for the individual segments. In another example, the synchronization information can include a time of operation or other time elapsed information. The synchronization information is incorporated into the encoded segments and then utilized by the video packaging and origination service 120 to assemble the set of ordered segments, remove duplicates and identifying missing encoded segments. In embodiments in which the video packaging and origination service 120 does not transmit synchronization information, such as if the original content provider 130 or other service provides the synchronization information, block 602 may be omitted.

Responsive to a request or trigger, as described above, the original content provider 130 begins transmitting a plurality of encoded content streams to the video packaging and origination service 120 and incorporating received/accessed synchronization information at block 604. In some embodiments, the encoders 132B and 132A may be configured to transmit non-overlapping segments in which the encoding task for the set of segments it distributed among encoders. In other embodiments, the encoders may be configured will at least partially overlapping encoded segments. At block 604, the video packaging and origination service 120 receives the plurality of incoming encoded content streams from the encoders. At decision block 606, a determination is made as to whether additional encoder segments streams are received. If so, the routine 600 returns to block 604 to receive the additional encoder streams. If not, the routine 600 proceeds to block 608.

At block 608, the video packaging and origination service 120 processes the received encoded segments. For example, the video packaging and origination service 120 can be adjustments or error correction for any of the selected encoded segments. In other embodiment, if the synchronization information does not ensure perfectly compatible encoded segments, the video packaging and origination service 120 can extrapolate additional segments or portions to facilitate combination. Still further, in some embodiments, the ingress component 122 of the video packaging and origination service 120 generates deterministic data included in a set of meta-data utilized to access and generate outgoing content streams. Illustratively, the deterministic data can include timestamp information related to a time of play of the set of encoded segments, sequence number identifying an order of the encoded content segment in the set of encoded segments, a time of operation of the encoder and the like. In another example, the ingress component 122 or content management service 126 can conduct quality or error checking that can be included in meta-data. At block 610, the video packaging and origination service 120 stores the cumulative set of encoded segments for delivery to user devices 102. As described above, the video packaging and origination service 120 can also associate or store meta-data associated with the segments. Routine 600 terminates at block 612 or starts a new iteration of routine 600.

Figure 7:
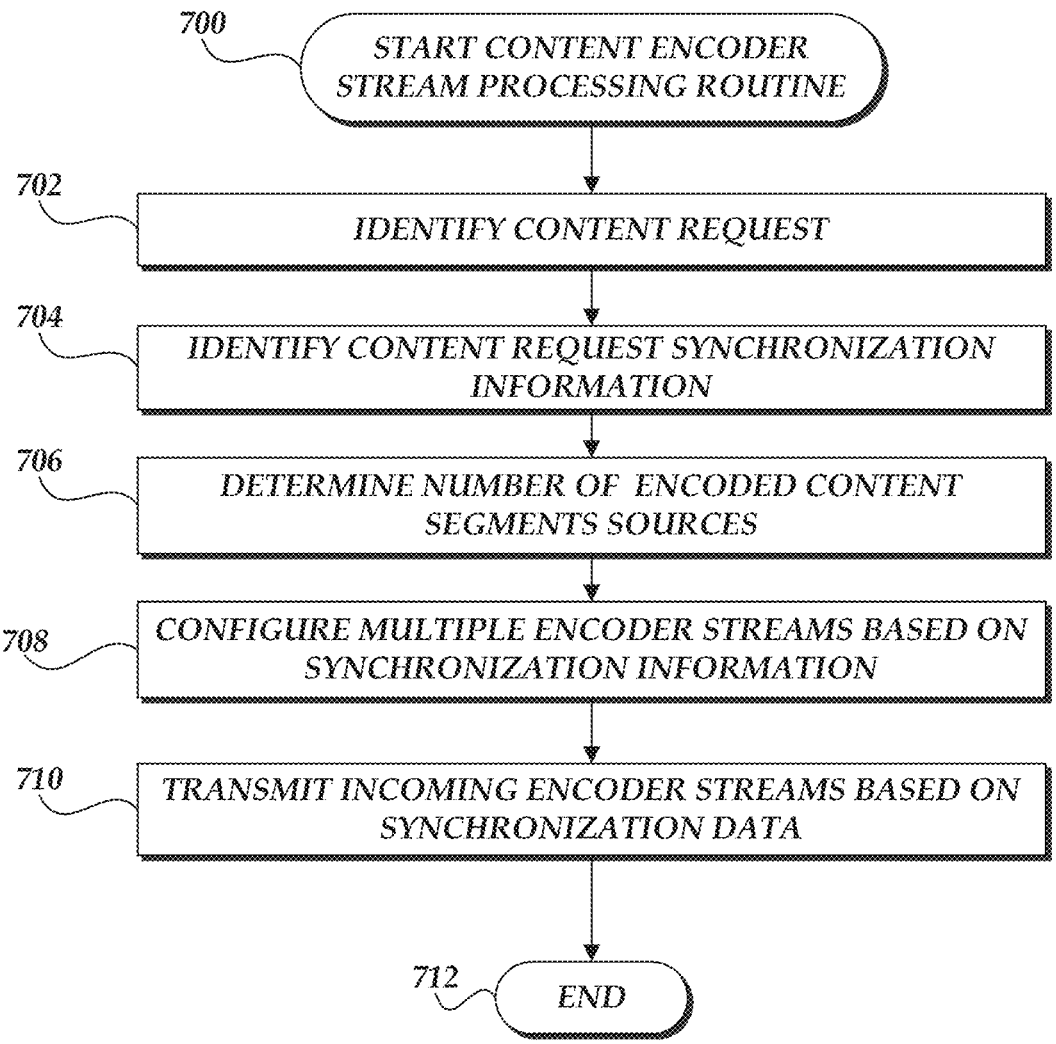
FIG. 7 is a flow diagram illustrative of a content processing routine implemented by a content provider to generate multiple content streams.

Turning now to FIG. 7, a routine 700 utilized by to generate multiple encoder streams will be described. Routine 700 may be illustratively implemented by multiple encoder components 132. At block 702, the encoder component 132 (directly or indirectly) determines that an encoded content should be provided. Illustratively, the encoded content can correspond to a set of encoded profiles corresponding to the encoding bitrate and format combinations that may be made available to users. For example, the video packaging and origination service 120 may provide a set of encoding bitrate and format combinations in order to support adaptive bitrate streaming. Accordingly, the content that will be delivered to the video packaging and origination service 120 may correspond to the set of identified encoding bitrates and formats or individual encoding bitrate and format combinations to supplement previously receive encoded segments. One skilled in the relevant art will appreciate that the transmission of the request or the identification of requested encoded segments (including format) can be facilitated in a number of ways.

At (2), the encoder can receive synchronization information or generate synchronization information. As described above, the synchronization information is utilized by multiple encoders 132 to allow encoded segments from multiple encoders to be combined seamlessly or substantially seamlessly. For example, the synchronization information can include timestamp information related to a relative timestamp of individual encoded segments in the set of encoded segments. In another example, the synchronization information can include sequence numbers for the individual segments. In another example, the synchronization information can include a time of operation or other time elapsed information. The synchronization information is incorporated into the encoded segments and then utilized by the video packaging and origination service 120 to assemble the set of ordered segments, remove duplicates and identifying missing encoded segments.

At block 706, the receiving original content provider 130 determines the number of encoders that will be utilized to generate the requested encoded content streams. Illustratively, the determination the number of encoders will generally corresponding to a plurality of encoders that generate encoded content streams for identified requested content and incorporating synchronization information. In one embodiment, the determination of the number of encoders can be based on the complexity of the encoded bitrate and formation combination, available encoder resources, an attributable cost associated with the generated encoded content segments, preferences or service levels associated with the video packaging and origination service 120, network conditions (e.g., available bandwidth, network throughput, error rates), demand from users devices (e.g., total number of requests or frequencies of requests), and the like.

At block 708, the original content provider causes the selected number of encoders to generate encoded streams based on synchronization information. As described above, the video packaging and origination service 120 may provide the synchronization information. In another embodiment, the original content provider 130 can utilize self-providing synchronization, information provided by a third-party service or a combination. At block 710, the original content provider begins transmitting a plurality of encoded content streams to the video packaging and origination service 120 and incorporating received/accessed synchronization information. In some embodiments, the encoders 132B and 132A may be configured to transmit non-overlapping segments in which the encoding task for the set of segments it distributed among encoders. In other embodiments, the encoders may be configured will at least partially overlapping encoded segments. Routine 700 terminates at block 712 or starts a new iteration of routine 700.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage streaming content comprising:
one or more computing devices associated with a video packaging and origination service, wherein the video packaging and origination service is configured to:
identify synchronization information corresponding to at least one of segment sequence numbering information or timestamp information;
obtain a first plurality of segments of a set of segments encoded according to an encoding profile from a first encoding node of a plurality of encoding nodes;
obtain a second plurality of segments of the set of segments encoded according to the encoding profile from a second encoding node of the plurality of encoding nodes, the second encoding node different from the first encoding node, wherein the first plurality of segments and the second plurality of segments are at least partially overlapping segments;
assemble at least one segment from the first plurality of segments and at least one segment from the second plurality of segments to form a set of ordered segments utilizing the synchronization information, wherein forming the set of ordered segments includes removing duplicate segments of the at least partially overlapping segments based on one or more of a quality measurement, a priority designation, and attributable cost; and
store the set of ordered segments and meta-data associated with the stored set of ordered segments.

2. The system of claim 1, wherein the video packaging and origination service transmits the at least one of segment sequence numbering information or time stamp information to an original content provider.

3. The system of claim 1, wherein the video packaging and origination service transmits information that identifies a source of the at least one of segment sequence numbering information or time stamp information.

4. The system of claim 1, wherein the first plurality of segments and the second plurality of segments are based on cost information associated with generating encoded segments.

5. The system of claim 1 wherein the video and origination service is further configured to select a number of encoding nodes to encode according to the encoding profile based at least in part on a complexity of the encoding profile.

6. A computer-implemented method to manage transmission of content comprising:
obtaining a first portion of a set of segments associated with a request for streaming content from a first identifiable encoder of a plurality of encoders encoding according to an encoding profile;
obtaining a second portion of the set of segments associated with the request for the streaming content from a second identifiable encoder of the plurality of encoders encoding according to the encoding profile and different from the first identifiable encoder, wherein the segments from the first and second portions are at least partially overlapping segments;
utilizing synchronization information to assemble the set of segments based on a combination of the first portion and the second portion, wherein assembling the set of segments includes removing duplicate segments based on one or more of a quality measurement, a priority designation, and attributable cost; and
storing the set of segments.

7. The computer-implemented method of claim 6 further comprising storing meta-data associated with the combination of the first portion and the second portion.

8. The computer-implemented method of claim 6 further comprising transmitting a request for synchronization information for utilization in the first and second portions of the set of segments.

9. The computer-implemented method of claim 6, wherein the request for streaming content includes cost selection information for use in determining the first portion and the second portion.

10. The computer-implemented method of claim 6 wherein the synchronization information is incorporated into the first portion and the second portion of the set of segments.

11. The computer-implemented method of claim 6, wherein assembling the first and second portions to form the set of segments includes designating a default source of the set of segments.

12. The computer-implemented method of claim 6, wherein assembling the first and second portions to form the set of segments includes selecting segments based on a time of receipt.

13. The computer-implemented method of claim 6 further comprising determining a failure in the first identifiable encoder.

14. The computer-implemented method of claim 13 further comprising requesting at least one segment from a third identifiable encoder of the plurality of encoders responsive to the determined failure of the first identifiable encoder.

15. The computer-implemented method of claim 13, wherein storing the set of segments includes modifying the set of segments responsive to the determined failure.

16. The computer-implemented method of claim 6 wherein a number of utilized encoders of the plurality of encoders is based at least in part on a complexity of the encoding profile.

17. A computer-implemented method to manage transmission of content comprising:
   identifying streaming content, the streaming content organized according to a set of segments;
   selecting a number of encoders encoding according to an encoding profile to provide requested content;
   causing generation of a plurality of encoder streams that are encoded according to the encoding profile, and corresponding to the selected number of encoders to provide the requested content, wherein the plurality of encoder streams includes at least partially overlapping segments;
   processing encoded segments from the selected number of encoders in accordance with time elapsed information to form a set of encoded content segments; and
   removing duplicate segments from the set of encoded content segments based on one or more of a quality measurement, a priority designation, and attributable cost.

18. The computer-implemented method of claim 17 further comprising identifying synchronization information for utilization in the generation of the plurality of encoder streams.

19. The computer-implemented method of claim 17, wherein selecting a number of encoders to provide the requested content includes selecting a number of encoders based on a complexity associated with the requested content.

20. The computer-implemented method of claim 17, wherein selecting a number of encoders to provide the requested content includes selecting a number of encoders based on a cost associated with the requested content.

21. The computer-implemented method of claim 17, further comprising determining a failure in an identifiable encoder.

22. The computer-implemented method of claim 21 further comprising selecting at least one additional encoder to provide the requested content in response to the determined failure.

23. The computer-implemented method of claim 17 wherein the number of encoders is based at least in part on a complexity of the encoding profile.

* * * * *